Patented Sept. 28, 1926.

1,601,302

UNITED STATES PATENT OFFICE.

JESSE K. FARLEY, JR., OF KENILWORTH, ILLINOIS.

CANDY AND PROCESS OF MAKING THE SAME.

No Drawing.   Application filed April 1, 1925.   Serial No. 19,994.

The present invention has for its object to produce a novel kind of candy and an efficient method of making the same.

Specifically considered, the present invention may be said to have for its object to produce a candy in which the sugars are in crystal form and which, at the same time, shall be puffed up so as to be extremely porous and light.

A candy may perhaps be made more or less porous by creating in the interior gases which, in escaping or attempting to escape, cause the candy to puff up or swell. To do this, however, the candy must be in a warm plastic condition and, after the gases have escaped, the candy might collapse and settle. In any event, even though the resulting product may be more or less porous, the sugar content thereof may be in an amorphous form and not crystalline.

I have discovered that a light, porous candy of crystalline structure may be obtained by the simple expedient of mixing with the mass of material, before it is fabricated into individual candies, something that will induce crystallization and something else that will produce the gases necessary to cause swelling; then heating to a temperature sufficient to soften the candy material and create the gases; and then cooling. The process must be so performed that crystallization will begin and be carried out sufficiently to prevent a collapse of the swollen or expanded candy before the sustaining effect of the gases is lost. In other words, crystallization and swelling or expanding must take place simultaneously, although the swelling or expanding may begin before crystallization and the completion of crystallization may take place after the expansion has stopped.

Crystallization may be induced at the proper time by mixing with the batch largely of amorphous material, a small quantity of crystal sugar, this being done while the batch of candy material is still plastic and before it has reached a state of equilibrium.

The material for producing the gases must be one in which the disassociation point is low that is, one in which the gases are formed at a temperature considerably below the highest temperature to which the candy material may successfully be heated. I have found that the best results are obtained by baking at temperatures of from 200° F., and 240° F., and therefore the gas-forming material must have a disassociation point well below those temperatures. Ammonium carbonate is a material whose disassociation point is low enough and, as it has long been used in the art of baking and elsewhere, it may be employed to advantage in my improved process. The sugar crystals constitute nuclei about which the sugar in the original candy batch crystallizes after the mass has been heated and begins to cool.

My improved process may be carried out as follows: A mixture of sucrose, dextrin and dextrose is first made. The sucrose may be either cane or beet sugar. The dextrin and dextrose may be ordinary corn syrup. The mixture is melted in water and the water is evaporated. The batch so made is allowed to cool partially. Before the batch has reached a condition of equilibrium and become hard, crystal sugar is worked into it. Then just before the mass is pulled in a candy pulling machine or otherwise, the ammonium carbonate is added. After the pulling has been completed, the mass is divided into small sections of a size and shape determined by the finished product to be made therefrom. These small bodies are then passed slowly through an oven, remaining in the same about ten minutes. The oven should be hottest at the point of entry and become cooler toward the point of exit. A temperature of from 200° F. to 240° F. depending on the thickness of the rudimentary candies, has been found to be satisfactory for the hottest part of the oven. In passing through the oven, the rudimentary candies first become heated to the point of plasticity; then the moisture is driven off; then the candies begin to swell owing to the formation of ammonia and carbon dioxide; and, as the swelling progresses, crystallization sets in. It is preferable to keep the candies hot for some minutes after they leave the oven, to permit a complete dissipation of the gases into which the ammonium carbonate resolves itself and to permit the completion of the crystallization. The candies are therefore preferably carried through the oven on an endless metal belt that extends a considerable distance beyond the oven at the exit point of the latter and thus continues to supply heat to the candies after they leave the oven.

The most satisfactory results have been obtained with a mixture containing somewhat more sucrose than corn syrup. An increase in the proportion of corn syrup slows up the rate of crystallization while a decrease in the proportion of corn syrup makes crystallization more rapid.

The finished candies have a volume about three times as great as the rudimentary candies, and have a firm crystalline structure.

While I have described with particularity a single specific way of carrying out my invention, in order to make the principle thereof plain, I do not desire to be limited to the exact details thus described; but intend to cover all such steps, formulæ and products as come within the definitions of my invention constituting the appended claims.

I claim:

1. The method of making candy, which consists in mixing with a plastic cooked batch of candy an ingredient to form nuclei of crystallization and an ingredient adapted to form gas and puff up the candy material under the action of heat, heating the mixture until such gas is evolved, and permitting the mixture to cool.

2. The method of making candy, which consists in thoroughly mixing with a batch of cooked candy, while still plastic an ingredient to form nuclei of crystallization and an ingredient adapted to form gas and puff up the mixture into pieces of the desired shape, dividing the batch into small pieces, heating such pieces until such gas is evolved, and then permitting said pieces to cool.

3. The method of making candy, which consists in mixing with a batch of candy, in which the sugars are largely in an amorphous state, while in a plastic state, an ingredient adapted to form nuclei of crystallization and a gas-producing ingredient having a low disassociation point, heating the mixture to a temperature above said disassociation point and high enough to render it sufficiently plastic to puff up under the action of the gases evolved, and then slowly cooling.

4. The method of making candy, which consists in mixing with a cooked batch of candy, while in a plastic state, an ingredient adapted to form nuclei of crystallization and a gas-producing ingredient having a low disassociation point, dividing the mixture into pieces of the desired size and shape, heating such pieces to a temperature above said disassociation point and sufficiently high to make the said pieces plastic and capable of swelling when the said gas is evolved, and then gradually cooling said pieces.

5. The method of producing a puffed candy having a crystalline structure, which consists in heating a cooked candy mass having distributed through the same nuclei of crystallization to a temperature high enough to cause crystallization to set in upon cooling, causing a gaseous fluid to be evolved within such mass, and gradually cooling the mass.

6. The method of producing a puffed candy having a crystalline structure, which consists in heating it and causing it to puff up under internal gas pressure and, before it has an opportunity to collapse, causing crystallization to begin and be carried to a point that the candy will be maintained in a puffed condition.

7. The method of producing a puffed candy having a crystalline structure, which consists in thoroughly mixing with a cooked candy mass, while still plastic, crystal sugar and ammonium carbonate, heating the mixture to a point somewhat above the disassociation point of the ammonium carbonate, and then slowly cooling.

8. The method of producing a puffed candy having a crystalline structure, which consists in cooking a mixture of sucrose, dextrin and dextrose, incorporating in the mixture, while still plastic, an ingredient to form nuclei of crystallization and a gas-forming ingredient having a low disassociation point, heating the mass to a temperature above said disassociation point and sufficiently high to render the mixture plastic, and then cooling.

9. The method of producing a puffed candy having a crystalline structure, which consists in cooking a mixture of sucrose, dextrin and dextrose, incorporating in the cooked mixture when comparatively cool and still plastic sugar in crystal form and ammonium carbonate, heating the mass to a temperature sufficiently high to permit it to puff up when the ammonium carbonate is transformed into a gas, and then cooling.

10. A puffed candy having a crystalline structure.

In testimony whereof, I sign this specification.

JESSE K. FARLEY, Jr.